US008035687B2

(12) United States Patent
Nishiyama (10) Patent No.: US 8,035,687 B2
(45) Date of Patent: Oct. 11, 2011

(54) IMAGE PROCESSING APPARATUS AND PROGRAM

(75) Inventor: Manabu Nishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 12/177,423

(22) Filed: Jul. 22, 2008

(65) Prior Publication Data

US 2009/0033758 A1    Feb. 5, 2009

(30) Foreign Application Priority Data

Aug. 1, 2007   (JP) .................................. 2007-201163

(51) Int. Cl.
    *H04N 5/225*     (2006.01)
(52) U.S. Cl. .......... 348/169; 382/103; 382/153; 901/47; 700/259
(58) Field of Classification Search ........................ None
See application file for complete search history.

(56) References Cited

U.S. PATENT DOCUMENTS

| | | | |
|---|---|---|---|
| 2005/0242953 A1* | 11/2005 | Nakagawa et al. | 340/572.1 |
| 2006/0126918 A1* | 6/2006 | Oohashi et al. | 382/153 |
| 2007/0219668 A1* | 9/2007 | Takahashi et al. | 700/249 |
| 2007/0222565 A1* | 9/2007 | Kawamata et al. | 340/435 |

FOREIGN PATENT DOCUMENTS

JP    2006-192563    7/2006

OTHER PUBLICATIONS

David G. Lowe, "*Distinctive Image Features from Scale-Invariant Keypoints*", International Journal of Computer Vision, 2004, pp. 1-28.

* cited by examiner

*Primary Examiner* — Nhan T Tran
*Assistant Examiner* — Dennis Hogue
(74) *Attorney, Agent, or Firm* — Ohlandt, Greeley, Ruggiero & Perle, L.L.P.

(57) ABSTRACT

An image processing apparatus includes unit reading, from first objects, information items for determining program procedures used to detect the first objects by image processing, unit selecting, from the program procedures, program procedures corresponding to the information items, and to determine an order of execution of the selected program procedures, unit acquiring an initial image including images corresponding to the first objects, the initial image being used for executing a first program procedure of a first order of execution, which is included in the selected program procedures, unit detecting, using the initial image, at least one of the first objects by executing the first program procedure corresponding to at least one of the first objects, and unit generating a post-removal image obtained by removing, from the initial image, image data corresponding to one of the images, which is on a first area corresponding to at least one detected object.

13 Claims, 4 Drawing Sheets

IMAGE PROCESSING APPARATUS AND PROGRAM

CROSS-REFERENCE TO RELATED APPLICATIONS

This application is based upon and claims the benefit of priority from prior Japanese Patent Application No. 2007-201163, filed Aug. 1, 2007, the entire contents of which are incorporated herein by reference.

BACKGROUND OF THE INVENTION

1. Field of the Invention

The present invention provides a scheme for enhancing the performance of detecting objects in an image containing the objects, and more particularly, relates to an image processing apparatus and program that use an information item from a read unit.

2. Description of the Related Art

It is a main object of image processing to detect and recognize a plurality of objects using image information. To this end, in general, features are beforehand extracted from objects using a certain scheme, and stored in units of types, and when objects are detected, features are extracted from an image including the objects, using the same scheme, and are compared with stored ones (see, for example, JP-A 2006-192563 (KOKAI), and David G. Lowe, "Distinctive image features from scale-invariant keypoints," International Journal of Computer Vision, 60, 2 (2004), pp. 91-110). Further, JP-A 2006-192563 (KOKAI), for example, discloses an approach to acquiring information on the type of an object (e.g., person information in JP-A 2006-192563) located in the vicinity, using a wireless IC tag, thereby narrowing down the range of object types and then executing comparison to enhance the accuracy of detection.

In the above-mentioned approach, features of objects are extracted from an image, using a single method. This method can exhibit high performance when the range of extraction is limited, for instance, when objects are limited to, for example, the faces of persons. However, it is difficult for a single feature extraction method to extract all features of objects when a large number of objects are targets.

BRIEF SUMMARY OF THE INVENTION

In accordance with an aspect of the invention, there is provided an image processing apparatus comprising: a read unit configured to read, from first objects, information items for determining program procedures used to detect the first objects by image processing; a selection unit configured to select program procedures corresponding to the information items, and to determine an order of execution of selected program procedures; an acquisition unit configured to acquire an initial image including images corresponding to the first objects, the initial image being used for executing a first program procedure of a first order of execution, which is included in the selected program procedures; a detection unit configured to detect, using the initial image, at least one of the first objects by executing the first program procedure corresponding to the at least one of the first objects; and a generation unit configured to generate a post-removal image obtained by removing, from the initial image, an image data item corresponding to one of the images, which is on a first area corresponding to at least one detected object, wherein: the detection unit executes a second program procedure of a second order of execution, which is included in the selected program procedures, to detect at least one of the first objects that corresponds to the second program procedure; and the generation unit removes, from the post-removal image, the image data item corresponding to another of the images, which is on a second area corresponding to at least one detected object that corresponds to the second program procedure, to update the post-removal image.

DETAILED DESCRIPTION OF THE INVENTION

An image processing apparatus and program according to an embodiment of the invention will be described in detail with reference to the accompanying drawings. The same reference numerals denote parts that perform the same operations in the following description, and a description thereof will not be repeated.

Firstly, a brief outline of the image processing apparatus of the invention will be given.

In the embodiment, to enable a large number of types of objects to be detected with a high success rate, a program including a plurality of image detection/recognition algorithms is prepared. Algorithms mean a series of processes for, for example, beforehand extracting features from objects using a preset scheme, storing them in units of types, extracting features from the stored images using the same scheme, and comparing the extracted features with stored ones. Namely, to process a wide range of objects, a plurality of feature extraction/collation methods are prepared. Further, a scheme (using tags) is prepared for to-be-detected objects located in the vicinity, for enabling information on the objects to be obtained by an image processing method using, for example, barcodes, or by a method, other than image processing, using, for example, a wireless IC tag. Each tag stores image processing algorithm ID information used for detecting an object, and a parameter assigned to the algorithm. Means for reading information from each tag is provided for the image processing apparatus. In the case of using a wireless IC tag, a receiver unit for receiving an electromagnetic wave is mounted. It is preferable that tags can acquire information through a method using electromagnetic waves, since they are not significantly influenced by the orientations of the objects or hiding objects.

The image processing apparatus firstly reads information from a tag attached to an object, then executes a detection algorithm according to the object, and detects what the object is. Actually, a plurality of algorithms can be assigned to one tag, and a tag reading device can read information from a plurality of tags. Therefore, it is necessary to execute a plurality of image processing algorithms. To this end, the image processing apparatus includes a processing order determination unit for determining the order of execution of algorithms, using information concerning, for example, the number of calculations of the algorithms, the detection success rate, and the positional relationship between objects obtained from preceding processing results. Further, after a certain algorithm is executed, the next algorithm is executed on an input image from which the detection result of the certain algorithm is removed. Thus, the latter algorithm, which has a lower success rate than the former algorithm, is executed with the search area narrowed.

The image processing apparatus of the embodiment can prepare algorithms dedicated to detection of a wide range of object types, and hence an algorithm of a high detection/recognition success rate can be selected for each object. The image processing apparatus further employs mechanisms for dealing with the case where a plurality of objects exist, and/or a plurality of algorithm candidates exist. In these mechanisms, the order of execution of the algorithms is determined based on the level of difficulty (the level of priority), such as the number of computations of each algorithm and the success rate of each algorithm, and an input image to be subjected to a certain algorithm executed after another algorithm is generated based on the detection result of the previous algorithm. These mechanisms enable an object, difficult to detect, to be detected with the search area narrowed, thereby enhancing the detection success rate and reducing the number of total computations. Furthermore, if data, such as a detection success rate obtained by a certain image processing apparatus, is stored in a tag, and is used as a reference value for determining the level of difficulty by another image processing apparatus. In this case, the "experience" of the former image processing apparatus can be reflected in the latter apparatus. When an object has been detected by a previously executed program procedure, a post program procedure is executed with the area corresponding to the detected object set as an invalid area, with the result that the success rates of program procedures having relatively low detection success rates are enhanced to thereby enhance the reliability of the entire image process.

The image processing apparatus and program according to the embodiment can detect a large number of types of objects at higher success rates.

Embodiment

Figure 1:
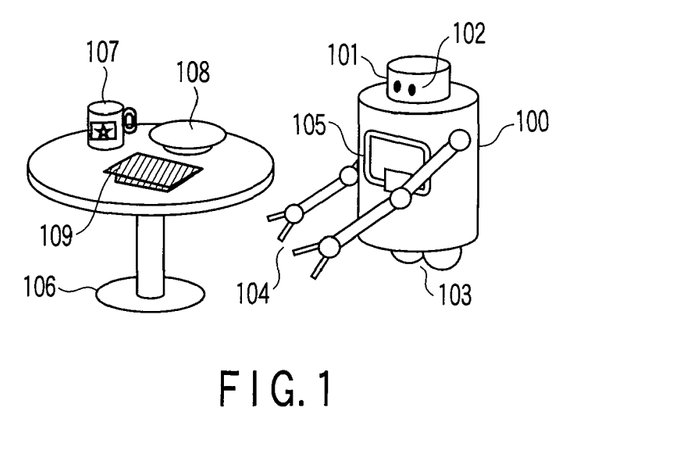
FIG. 1 is a view illustrating an example of use of an image processing apparatus according to an embodiment.

Referring now to FIG. 1, a description will be given of a case where the image processing apparatus according to the embodiment is used.

The image processing apparatus of the embodiment is installed in, for example, a robot 100 as shown in FIG. 1. The robot 100 comprises cameras 101 and 102 for three-dimensionally detecting an object, a movement mechanism (e.g., wheel) 103, arms 104 for handling the detected object, and a wireless IC tag reader 105 for reading a wireless IC tag attached to the object.

The image processing apparatus of the embodiment is used when performing detection, recognition and position measuring processes based on an image picked up by a camera (hereinafter referred to as a "camera image"), to enable the robot 100 to grasp and carry table ware pieces 107, 108 and 109 placed on a table 106.

Figure 2:
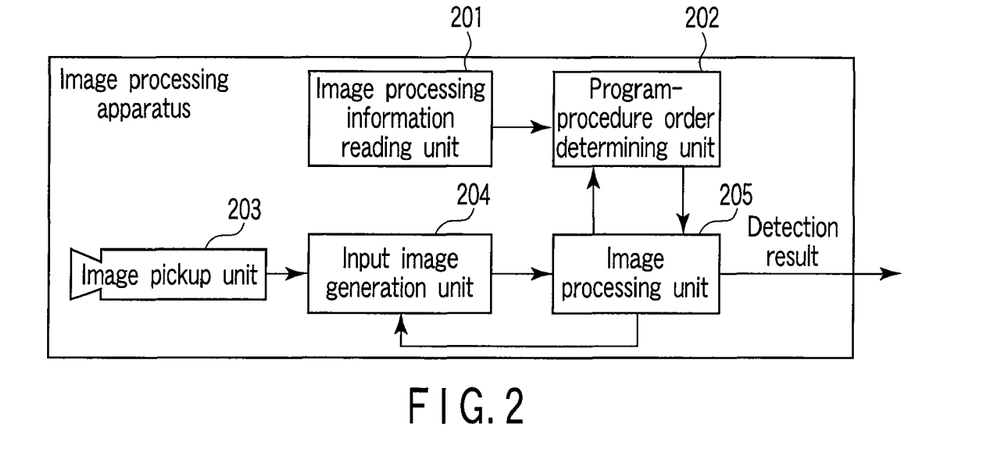
FIG. 2 is a block diagram illustrating the image processing apparatus of the embodiment.

Referring to FIG. 2, the image processing apparatus of the embodiment will be described.

The image processing apparatus of the embodiment comprises an image processing information reading unit 201, program-procedure order determining unit 202, image pickup unit 203, input image generation unit 204 and image processing unit 205.

The image processing information reading unit 201 reads, from a plurality of objects by image processing, information items stored for the respective objects and used for detecting the objects by image processing. The image processing information reading unit 201 reads, for example, information from a wireless IC tag attached to a target object to be grasped. The image processing information reading unit 201 includes the wireless IC tag reader 105. On the other hand, wireless IC tags are attached to target objects to be handled by the robot 100, e.g., the table ware pieces 107, 108 and 109 shown in FIG. 1. The wireless IC tags are designed to provide algorithm information useful in detecting the objects by image processing, and also provide parameter information to be assigned to the algorithm information. The algorithm information is, for example, ellipse detection method (this means that the effective algorithm is the "ellipse detection method"), and the parameter information is, for example, a diameter of 11 cm (this means that the diameter of table ware pieces is 11 cm). These information items may be directly written to the memory area of each wireless IC tag, or may be stored in a database that is not contained in each wireless IC tag and be read therefrom as information necessary for image processing, using the tag ID information of each wireless IC tag as a key to the information items.

The program-procedure order determining unit 202 selects object detection program procedures corresponding to the information items acquired by the image processing information reading unit 201, and determines the order of the program procedures. The program-procedure order determining unit 202 selects, from read tag information, program procedures necessary for detecting objects, and determines the order of the program procedures, based on various information items related to the read tag information. The program-procedure order determining unit 202 prepares program procedures including image processing algorithms corresponding to those contained in the image processing information acquired using tags. In the embodiment, assume that the program-procedure order determining unit 202 beforehand employs, as image processing algorithm examples, (1) an area detection processing method (also called a threshold-value processing method) using threshold values corresponding to the RGB values of pixels, (2) a template matching method for detecting a similar object in an image using texture information on a target object as template information, and (3) an ellipse detection method for detecting an elliptic portion in an edge component contained in an image. These detection methods will be described after the image processing unit 205 of the image processing apparatus is described.

The image pickup unit 203 acquires an initial image including the images of a plurality of objects. Specifically, the image pickup unit 203 acquires an image of, for example, a robot's work space. The image pickup unit 203 is, for example, a standard CCD or a CMOS camera. The image pickup unit 203 includes cameras 101 and 102. Each image is acquired as a set of pixel values indicating digitized colors, such as RGB values.

The input image generation unit 204 generates an image (this image will hereinafter be referred to as a "post-removal image") in which the area of each object detected in the image by the last program procedure is removed. The input image generation unit 204 receives image data from the cameras, and generates input data to be subjected to a program procedure. The method of generating an input image will be described later with reference to step ST407 of FIG. 4.

The image processing unit 205 executes the above-mentioned program procedures on an initial image in a preset order to sequentially detect a plurality of objects. Further, the image processing unit 205 executes the next program procedure on each image after removal to detect an object corresponding to this program procedure. The image processing unit 205 executes program procedures in the order determined by the program-procedure order determining unit 202, using generated image data as input data. When there exist a plurality of objects, or a plurality of image processing algorithms are assigned to one object, it is necessary to execute a plurality of program procedures on a single camera image. The outputs of the image processing unit 205 are the outputs of program procedures (for example, information on whether detection has succeeded, detailed classification of each object, three-dimensional position information on each object). The information as to whether detection has succeeded is output to the program-procedure order determining unit 202.

A brief description will now be given of each algorithm used as an example. Firstly, in the threshold-value processing method (1), threshold conditions for the R, G and B pixel values are received as parameters. These conditions are, for example, "R>150, G<230, B: no conditions." Such parameter information can be recorded in a wireless IC tag or database as a numerical value string or character string. In this case, firstly, it is determined whether each pixel of an input image satisfies a threshold value condition given as a parameter, thereby binarizing the image based on the determination result. Note that at this time, no processing is executed on an invalid area, described later, contained in the image. Invalid areas are not processed in all algorithms. Subsequently, the binarized image is divided into areas each of which contains continuous pixels satisfying a condition. If the thus-obtained areas include an area having a size not less than a preset threshold value, this area is regarded as a detected area, and it is determined that detection has succeeded. A work target area is photographed using a plurality of cameras, and one of the thus obtained images is subjected to the above-described procedure. If the detected area is used as a template, and template matching is performed on another image, three-dimensional information concerning the detected object can be obtained using the principle of stereo viewing.

Figure 3:
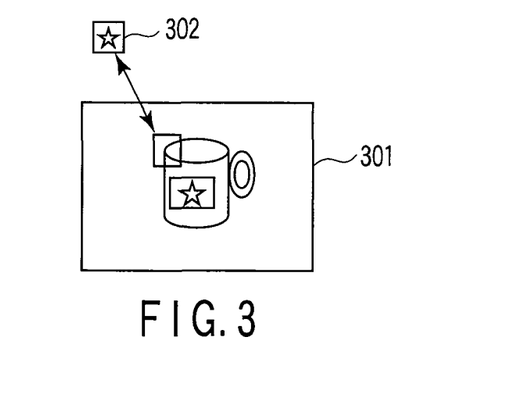
FIG. 3 is a view useful in explaining a template matching method.

The template matching method (2) will be described. An image of a to-be-detected object is used as a template. As shown in FIG. 3, an image of the same size as a template image 302 is repeatedly extracted from an input image 301 to detect an image area that has the highest similarity. If the area has the highest similarity, and if the similarity is higher than a preset threshold value, it is determined that the area is a to-be-detected object area. The similarity is, for example, the sum of the absolute values of the differences between the corresponding pixel values of the template image and input image, or the sum of the square values of the differences. Like the aforementioned threshold value processing method, the three-dimensional position of the to-be-detected object can be computed using a plurality of camera images simultaneously picked up by a plurality of cameras. Further, no detection is performed on invalid areas in images. In the case of the template matching method, since different templates are used for different objects, the parameter contained in image processing information indicates ID information assigned to an object to be detected by template matching. The ID information can be expressed by an integer value.

The last ellipse detection method (3) is used to detect objects having a circular portion, such as bowls and dishes. In this method, firstly, edge information is detected in an input image using, for example, a Canny operator. Subsequently, the edge information is divided into information items indicating continuous edges. Concerning each edge information item obtained by the division, the values of A, B, C, D, E and F included in the equation for ellipses, $Ax^2+By^2+Cxy+Dx+Ey+F=0$, are computed using the least square method. The parameters of the computed ellipse data are estimated by computing the distance between corresponding points indicated by the ellipse data and each edge information item. If the estimated value is not lower than a preset value, the object indicated by the corresponding edge information item is determined to be an elliptic one. In this algorithm, if two cameras are used, not only the three-dimensional position of an object, but also the actual size of a detected ellipse can be obtained. Using the size information, the range of objects can be narrowed down. Thus, algorithm parameter information contained in image processing information can indicate the actual size (numerical value) of a to-be-detected object, specifying that "this dish has a radius of 60 mm."

As mentioned above, algorithm parameter information contained in image processing information obtained from a tag can be expressed by a string of numerical values or characters. The above-described three algorithms are just examples. The algorithms to be actually mounted in the program-procedure order determining unit 202 are not limited to the three algorithms. However, the information imparted to each algorithm can be recorded to a wireless IC tag or database as in the above-mentioned three algorithms. Further, algorithm ID information can be expressed by a sequential number or a character string indicating an algorithm name.

Figure 4:
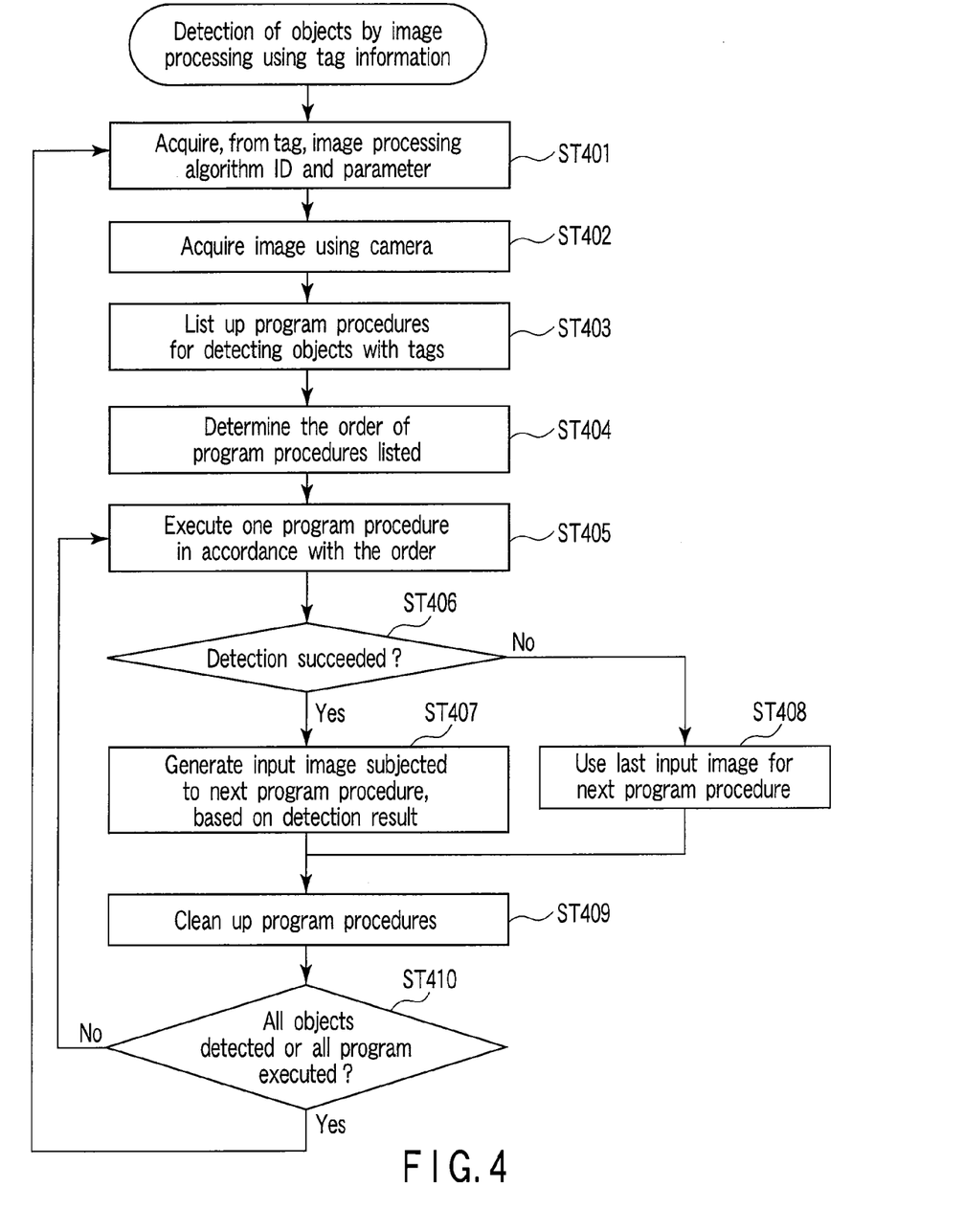
FIG. 4 is a flowchart illustrating an operation example of the image processing apparatus of FIG. 2.

Referring then to FIG. 4, a description will be given of an operation example of the image processing apparatus of FIG. 2. Assume that the robot 100 shown in FIG. 1 has moved, using the moving mechanism 103, to the table 106 with table ware pieces as work targets, before the procedure of the flowchart is executed. This can be done by providing the robot with information on the position of the table by some means, and moving the robot to the table, or circulating the robot in the room and causing the wireless IC tag reader 105 to detect the position of a tag.

The procedure of the flowchart will now be described. Firstly, the image processing information reading unit 201 detects a wireless IC tag attached to a handling target object around the robot (step ST401). Specifically, tags attached to table ware pieces 107, 108 and 109 in FIG. 1 are detected. Further, the image processing information reading unit 201 reads, from the detected tag, the ID information and parameter related to the image processing algorithm used for detection (step ST401). Since all wireless IC tags existing around the robot are read, all objects corresponding to the tags do not always exist within the range of view. However, this process can narrow down the range of to-be-detected objects.

After that, the image pickup unit 203 picks up an image (step ST402). For instance, an object existing ahead of the robot is photographed using the cameras 101 and 102 mounted on the robot 100. Since two cameras are used, three-dimensional position information of an object can be acquired. In the following description, it is assumed that the image of FIG. 5 has been acquired by one of the cameras.

Thereafter, the program-procedure order determining unit 202 lists up, at step ST403, the program procedure(s) necessary to detect a handling target object (or objects) corresponding to the tag(s) detected at step ST401. In this embodiment, the following program procedures (using image processing algorithms and their parameters) are executed on the table ware piece denoted by 107 in FIG. 1 (=502 in FIG. 5), 108 in FIG. 1 (=503 in FIG. 5) and 109 in FIG. 1 (=504 in FIG. 5).

Figure 5:
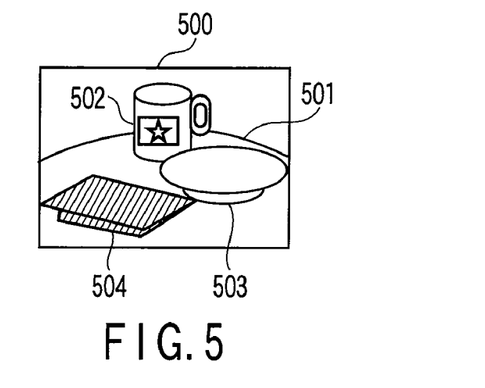
FIG. 5 is a view illustrating an image example obtained by the image pickup unit shown in FIG. 2.

(1) Ware piece 107 (502): Two algorithms are used, i.e., the ellipse detection method (with a parameter of radius: 50 mm), and the template matching method (using the side label of the ware piece 107 as a template);

(2) Ware piece 108 (503): Two algorithms are used, i.e., the ellipse detection method (with a parameter of radius: 100 mm), and the threshold value processing method (using R>210, G>210, B>210 as a threshold value condition); and (3) Ware piece 109 (504): A single algorithm is used, i.e., the threshold value processing method (using R>210, G<100, B<100 as a threshold value condition).

In this example, the ellipse detection method and threshold value processing method are used for detecting two objects. However, the ellipse detection method can detect a plurality of objects during execution of one program procedure, whereas the threshold value processing method can detect at a time only an object (or objects) that matches a single condition. Accordingly, the number of program procedures actually executed is four in total, i.e., i) ellipse detection for ware pieces 107 and 108, ii) template matching for ware piece 107, iii) threshold-value processing for ware piece 108, and iv) threshold-value processing for ware piece 109.

In the above example, three algorithms are used. However, when a larger number of image processing algorithms are mounted, if all program procedures are executed on each input image data item, the computation cost becomes enormous. In the embodiment, the computation cost is reduced by selecting a program procedure corresponding to each object around the robot, and the possibility of erroneous detection of an object that does not exist around the robot can be reduced.

The order of steps ST402 and ST403 may be reversed.

After that, the program-procedure order determining unit 202 determines the order of execution of the listed program procedures (step ST404). The program-procedure order determining unit 202 determines the level of priority of each program procedure, and starts to execute program procedures in a decreasing order of priority level. The priority level is referred to for order determination. The priority level is the weighted sum of the numerical values that are obtained in units of program procedures and correspond to the following criteria (a) to (f): (a) The number of computations between algorithms (the order of execution of program procedures is arranged in an increasing order of the number of computations); (b) the degree of reliability of each algorithm (the order of execution of program procedures is arranged in a decreasing order of detection success rate between algorithms used in the respective program procedures); (c) the depth computed from the three-dimensional position of a handling target object (the order of execution of program procedures is arranged so that objects will be detected in an increasing order of depth determined from the positional information concerning a plurality of objects, which is obtained by the last detection result of the image processing unit 205); (d) the rate of hiding indicating to what a degree an object is hidden by another object in an image (the order of execution of program procedures is arranged so that objects are detected in an increasing order of hiding rate, based on the hiding rates of the objects obtained from the last detection result of the image processing unit 205); (e) the rate of success corresponding to the combination of each object and each detection algorithm (the order of execution of program procedures is arranged so that the combinations of objects and program procedures are detected in a decreasing order of success rate); and (f) the intensity of an electromagnetic wave of each wireless IC tag (the order of execution of program procedures is arranged so that objects are detected in a decreasing order of the electromagnetic wave intensity of the wireless IC tag). Each criterion (a) to (f) has a numerical value range of, for example, 0 to 100. (a): The smaller the number of computations, the higher the numerical value. (b): The higher the reliability (e.g., the rate of success) of the algorithm itself, the higher the numerical value. (c): The closer to the cameras, the higher the numerical value. (d): The lower the hiding rate, the higher the numerical value. (e): The higher the success rate, the higher the numeral value. (f): The higher the intensity of the electromagnetic wave, the higher the numerical value. Namely, the closer the object is estimated to be positioned and the higher the hiding rate of the object is estimated, the higher the numerical value. The level of priority, i.e., the weighted sum of the numerical values (scores) of the criteria is computed for each program procedure, and the program procedures are arranged in a decreasing order of priority level.

More specifically, concerning criteria (c) to (f), the average value of objects detected by each program procedure is computed. Criteria (a) and (b) can be predetermined in units of image processing algorithms, since they can be estimated before execution of program procedures. Criteria (c) and (d) cannot be determined unless a program procedure is executed at least one time, and hence an estimation value of 0 is set in the initial frame of an object image. Also in the second or later frame, the estimation value of an object that was not detected in the preceding frame is set to 0. Concerning criterion (c), higher numerical values are imparted to the program procedures corresponding to objects of shallower depths determined from the positional information on all objects that is acquired from the last detection result of the detection means. Criterion (f) is also determined only during execution of a program procedure. Actually, the intensity of an electromagnetic wave is determined at step ST401. This electromagnetic intensity is used as an estimation value. Criterion (e), i.e., the rate of success, can be obtained for the first time when a program procedure has been executed at least one time. However, if the robot itself, or another robot or an image processing apparatus mounted in another type of model stores a success rate, obtained when it has performed a program procedure on an object, in the storage area of a tag attached to the object or in a database (not shown), it can use the previous success rate for current estimation. For instance, the program-procedure order determining unit 202 computes the success rate of each program procedure based on information as to whether detection has succeeded, obtained from the image processing unit 205. In the case of using a built-in database, a storage unit (not shown) stores each object, the program procedure corresponding thereto, and the detection success rate obtained when the program procedure is executed, in relation to each other. In the case of using tags, they incorporate wireless IC tags that store program procedures, used to detect objects, in relation to the detection success rates of the program procedures, and the image processing information reading unit 201 receives the program procedures and detection success rates from the wireless IC tags.

The thus-determined program-procedure execution order is set so that the lower the computation cost of a program procedure, and the more easily the program procedure can detect an object, the higher the priority of the program procedure.

At the next step ST405, the image processing unit 205 executes a program procedure in accordance with the order determined at step ST404. The content of the program procedure is determined depending on the type of algorithm mounted. Execution results, such as detection success/failure, three-dimensional position (obtained when detection has succeeded), and the hiding rate of an object by another object, are fed back regardless of the type of program procedure. These results are used as the outputs of the image processing apparatus, and used to update the order determination criteria at step ST404.

At step ST406, the image processing unit 205 determines whether the program procedure executed at step ST405 has succeeded in detecting an object. If succeeded in detecting an object, the input image generation unit 204 generates input image data to be processed by the next program procedure, based on the input image data processed by the last program procedure (step ST407). Specifically, when an object has been detected in the input image data subjected to the last program procedure, the area corresponding to the detected object is set as an invalid area, and the resultant image data is used as input image data for the next program procedure.

Figure 6:
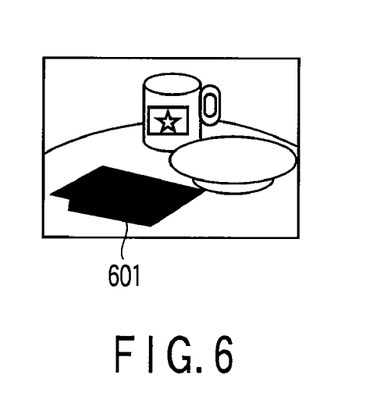
FIG. 6 is a view showing an example of an input image generated by setting an invalid area therein.

Referring then to FIGS. 5 and 6, a description will be given of generation of input data. If the order determination at step ST404 indicates that the initially executed program procedure is threshold value processing for detecting a table ware piece 504, and the next program procedure is template matching for detecting a table ware piece 502, the input image data to be subjected to threshold value processing is camera image data itself. If the table ware piece 504 has been detected by the execution of the program procedure, the area of the table ware piece 504 is set as an invalid area 601 as shown in FIG. 6. Since the resultant image is used as an input image for the template matching process, the invalid area corresponding to the table ware piece 504 is not searched in the template matching process. Since such an operation is repeated, the later the execution of a program procedure, the greater the invalid area and hence the narrower the search range. As a result, the number of computations can be reduced, the success rate of each program procedure be enhanced, and the reliability of the entire image process be enhanced.

In contrast, if object detection has failed at step ST405, the input image generation unit 204 uses the input image used for the last program procedure, as an input image for the next program procedure (step ST408).

After that, the image processing unit 205 cleans up the set of program procedures (step ST409). A plurality of methods for cleaning up program procedures are possible, and will be described later with reference to FIGS. 7, 8 and 9.

Lastly, the image processing unit 205 determines whether all objects have been detected (step ST410). If there remain a not-detected object and a not-executed program procedure, step ST405 is returned. If all objects have been detected, the detection results of all executed program procedures are used as the outputs of the image processing apparatus. Based on the results, the robot 100, for example, moves to approach the objects and handles them by the arms 104 to achieve the target work. The image processing apparatus returns to step ST401 to repeat the above processes beginning with the detection of a tag.

Figure 7:
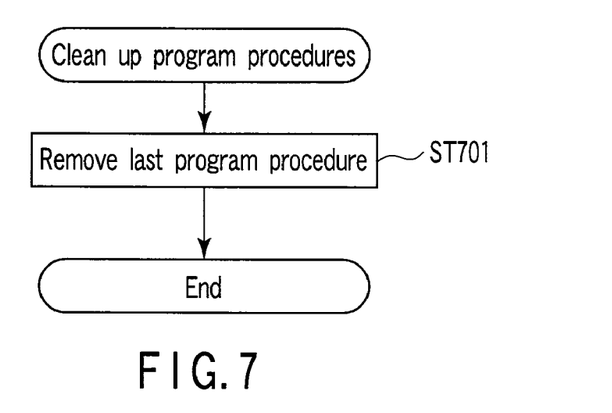
FIG. 7 is a flowchart illustrating an operation example performed at the step of cleaning up a set of program procedures in FIG. 4.
Figure 8:
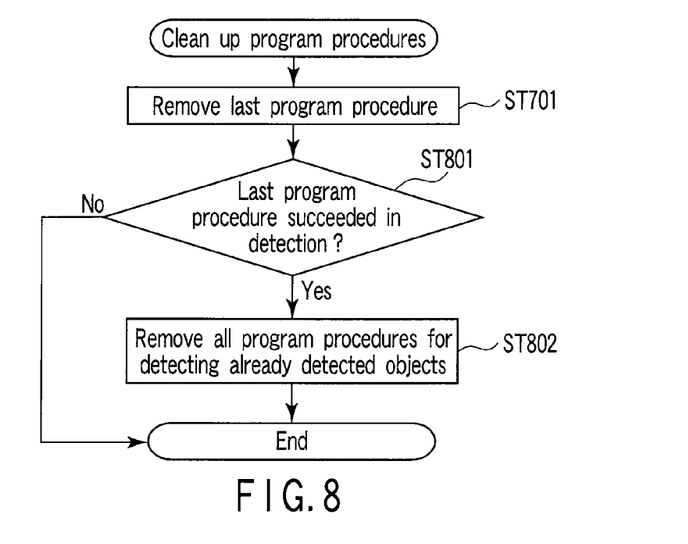
FIG. 8 is a flowchart illustrating another operation example performed at the step of cleaning up a set of program procedures in FIG. 4.
Figure 9:
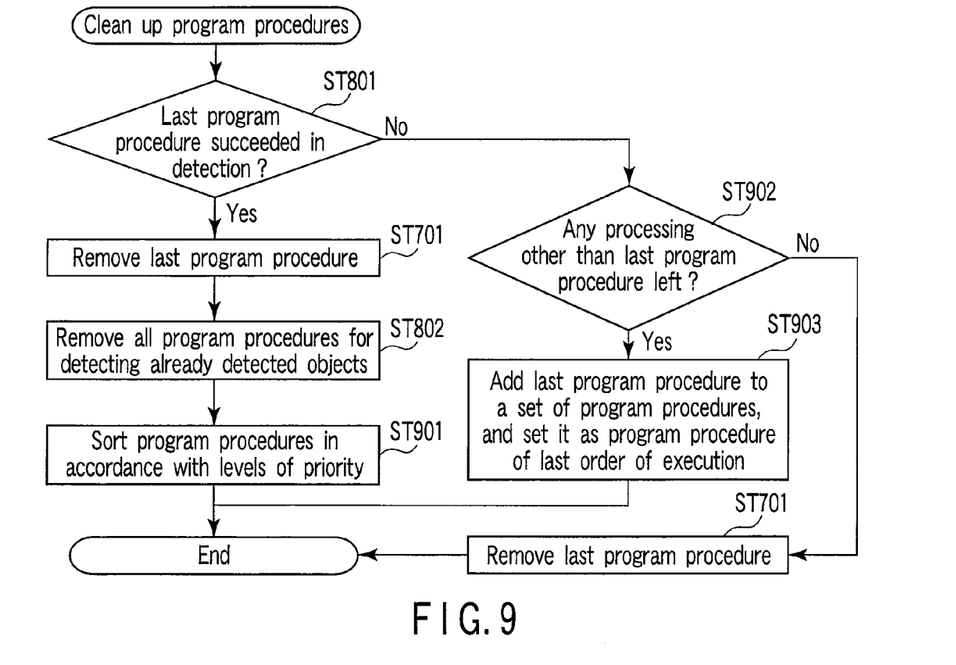
FIG. 9 is a flowchart illustrating yet another operation example performed at the step of cleaning up a set of program procedures in FIG. 4.

Referring to FIGS. 7, 8 and 9, a description will be given of methods of cleaning up the program procedures at step ST409. The following processes are all performed by the image processing unit 205.

FIG. 7 shows the simplest clean-up method, in which the image processing unit 205 merely removes the last program procedure (step ST701).

FIG. 8 shows the next simplest method. In this case, a program procedure or program procedures for detecting an already detected object are removed, as well as the last program procedure (step ST701). More specifically, after executing step ST701, the image processing unit 205 determines whether the last program procedure has succeeded to detect a target object (step ST801). If detection at step ST801 has succeeded, all program procedures listed up at step ST403 for detecting the already detected target object are removed (step ST802). In contrast, if detection at step ST801 has failed, clean-up of program procedures has been finished (step ST802). In the example of FIG. 8, since it is meaningless to execute a program procedure for detecting an already detected object, the execution of this program procedure is omitted to thereby reduce the computation cost.

FIG. 9 shows the most complex clean-up method. In this case, a program procedure that has failed in detecting an object is re-executed (step ST903) to enhance the detection success rate. Specifically, if detection of an object has succeeded at step ST801, steps ST701 and ST802 are sequentially executed to sort program procedures in the order of priority and finish the clean-up of the program procedures (step ST901). If the detection has failed at step ST801, it is determined whether there remains any program procedure other than the last one (step ST902). If it is determined that there is a program procedure other than the last one, the last program procedure is added to a set of program procedures obtained so far, and set as a program procedure of the last order of execution (step ST903). In contrast, if it is determined that there is no program procedure other than the last program procedure, step ST701 is executed, followed by the termination of the clean-up process of the program procedure set. In the image processing apparatus of the embodiment, the later the execution of the program procedure, the narrower the search range. Therefore, if a program procedure is executed again after it fails in detecting an object, it may well succeed.

By dynamically changing the order of execution as shown in FIGS. 8 and 9, the computation cost can be reduced, and the total detection success rate can be enhanced.

As described above, in the embodiment, a to-be-executed program procedure, i.e., a program procedure of a relative low computation cost and a relatively high detection success rate, is selected based on information acquired from a tag, and performed. By virtue of this structure, the lower the detection success rate, and/or the longer the execution time, the greater the invalid area and hence the smaller the area to be actually processed. The advantage of facilitating detection by virtue of narrowing the search area, and the advantage of shortening the required execution time enhance the entire detection efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a read unit configured to read, from first objects, information items for determining program procedures used to detect the first objects by image processing;
a selection unit configured to select program procedures corresponding to the information items, and to determine an order of execution of selected program procedures;
an acquisition unit configured to acquire an initial image including images corresponding to the first objects, the initial image being used for executing a first program procedure of a first order of execution, which is included in the selected program procedures;
a detection unit configured to detect, using the initial image, at least one of the first objects by executing the first program procedure corresponding to the at least one of the first objects; and
a generation unit configured to generate a post-removal image obtained by removing, from the initial image, an image data item corresponding to one of the images, which is on a first area corresponding to at least one detected object,
wherein:
the detection unit executes a second program procedure of a second order of execution, which is included in the selected program procedures, to detect at least one of the first objects that corresponds to the second program procedure; and
the generation unit removes, from the post-removal image, the image data item corresponding to another of the images, which is on a second area corresponding to at least one detected object that corresponds to the second program procedure, to update the post-removal image.

2. The apparatus according to claim 1, wherein the selection unit rearranges the order of execution of the selected program procedures in an increasing order of numbers of computations.

3. The apparatus according to claim 1, wherein the selection unit rearranges the order of execution of the selected program procedures in a decreasing order of algorithm detection success rate in the selected program procedures.

4. The apparatus according to claim 1, wherein the selection unit rearranges the order of execution of the selected program procedures, based on position information on second objects included in the first objects and obtained from a last detection result of the detection unit, to detect the second objects detected in an increasing order of depth.

5. The apparatus according to claim 1, wherein the selection unit rearranges the order of execution of the selected program procedures, based on a rate of hiding at which each of second objects included in the first objects and determined from a last detection result of the detection unit is hidden by another object, to detect the second objects in an increasing order of rate of hiding.

6. The apparatus according to claim 1, further comprising a memory unit which stores, in relation to each other, each of the first objects, a corresponding one of the program procedures used to detect each object, and a detection success rate obtained when the corresponding one program procedure has succeeded in detecting each object, and wherein the selection unit rearranges the order of execution of the selected program procedures, referring to the memory unit, to cause the detection unit to execute combinations of second objects and the selected program procedures in a decreasing order of detection success rate, the second objects being included in the first objects.

7. The apparatus according to claim 1, wherein:
the read unit includes a receiving unit configured to receive the information items and success detection rates from wireless IC tags incorporated in the first objects, the success detection rates being written in the wireless IC tags in relation to the information items, and each indicating at what rate detection of an object succeeds, and
the selection unit rearranges the order of execution of the selected program procedures referring to the detection success rates sent from the wireless IC tags, to cause the detection unit to execute combinations of second objects and the selected program procedures in a decreasing order of detection success rate, the second objects being included in the first objects.

8. The apparatus according to claim 1, wherein the selection unit rearranges the order of execution of the selected program procedures referring to a database located outside the image processing apparatus and storing, in relation to each other, each of the first objects, a corresponding one of the program procedures used to detect each object, and a detection success rate obtained when the corresponding one program procedure has succeeded in detecting each object, to cause the detection unit to execute combinations of second objects and the selected program procedures in a decreasing order of detection success rate, the second objects being included in the first objects.

9. The apparatus according to claim 1, wherein:
the read unit includes a receiving unit configured to receive the information items from wireless IC tags incorporated in the first objects; and
the selection unit rearranges the order of execution of the selected program procedures, to cause the detection unit to execute combinations of second objects and the selected program procedures in a decreasing order of electromagnetic wave intensity from the wireless IC tags, the second objects being included in the first objects.

10. The apparatus according to claim 1, wherein the selection unit determines that the smaller the number of computations in each program procedure, the higher a first level of priority, that the higher a detection success rate of an algorithm for use in each program procedure, the higher a second level of priority, that the lower a rate of hiding at which each object is hidden by another object, the higher a fourth level of priority, that the higher a detection success rate of each program procedure, the higher a fifth level of priority, and that the higher the intensity of an electromagnetic wave emitted from a wireless IC tag incorporated in each object, the higher a sixth level of priority, the selection unit rearranging the order of execution of the selected program procedures in a decreasing order of a factor which is a weighted sum of at least two of the first to sixth levels of priority.

11. The apparatus according to claim 1, wherein the detection unit executes, on the updated post-image, a third program procedure of a third order of execution included in the selected program procedures, with the second program procedure removed, to detect an object included in the first objects and corresponding to the third program procedure.

12. The apparatus according to claim 1, wherein when the second program procedure has succeeded in detecting an object corresponding thereto and included in the first objects, the detection unit executes, on the updated post-image, a third program procedure of a third order of execution included in the selected program procedures, with the first program procedure removed and the second program procedure removed, to detect an object included in the first objects and corresponding to the third program procedure.

13. The apparatus according to claim 1, wherein when the second program procedure has failed in detecting an object corresponding thereto and included in the first objects, and the selected program procedures still include a residue program procedure other than the first program procedure and the second procedure, the detection unit executes, on the updated post-image, a third program procedure of a third order of execution included in the selected program procedures, with the second program procedure added as a last order of execution to the order of execution.

* * * * *